United States Patent
Miller et al.

(10) Patent No.: US 10,837,600 B2
(45) Date of Patent: Nov. 17, 2020

(54) CONDENSATE DRAIN APPARATUS

(71) Applicant: Spirax-Sarco Limited, Cheltenham, Gloucestershire (GB)

(72) Inventors: Jeremy Miller, Cheltenham (GB); David Oliver, Cheltenham (GB); Peter Usher, Cheltenham (GB)

(73) Assignee: Spirax-Sarco Limited, Cheltenham (GB)

( * ) Notice: Subject to any disclaimer, the term of this patent is extended or adjusted under 35 U.S.C. 154(b) by 170 days.

(21) Appl. No.: 16/071,808

(22) PCT Filed: Jan. 27, 2017

(86) PCT No.: PCT/GB2017/050208
§ 371 (c)(1),
(2) Date: Jul. 20, 2018

(87) PCT Pub. No.: WO2017/129986
PCT Pub. Date: Aug. 3, 2017

(65) Prior Publication Data
US 2019/0032848 A1  Jan. 31, 2019

(30) Foreign Application Priority Data
Jan. 28, 2016 (GB) .................................. 1601632.1

(51) Int. Cl.
*F16T 1/02* (2006.01)
*F16T 1/48* (2006.01)
*F01K 25/08* (2006.01)

(52) U.S. Cl.
CPC ............... *F16T 1/48* (2013.01); *F01K 25/08* (2013.01); *F16T 1/02* (2013.01)

(58) Field of Classification Search
CPC ...................................... F16T 1/02; F16T 1/48
See application file for complete search history.

(56) References Cited

U.S. PATENT DOCUMENTS

| 3,914,795 A * | 10/1975 | Alliston .................. G09B 9/00 |
| | | 376/217 |
| 4,197,990 A | 4/1980 | Carberg et al. |

(Continued)

FOREIGN PATENT DOCUMENTS

| FR | 2395458 A1 | 1/1979 |
| JP | 19900292599 | 6/1992 |
| WO | 2012152921 A2 | 11/2012 |

OTHER PUBLICATIONS

Sep. 17, 2019—(JP) Office Action 2018-538835—English Translation.

(Continued)

*Primary Examiner* — Jonathan Bradford
(74) *Attorney, Agent, or Firm* — Banner & Witcoff, Ltd.

(57) ABSTRACT

A condensate drain apparatus including a valve for controlling discharge of condensate from the condensate drain apparatus; a collection chamber configured to receive a multiphase fluid flow upstream of the valve including gaseous and condensate phases, the collection chamber defining a collection volume for collecting the condensate to be discharged through the valve; sensor equipment for monitoring a parameter relating to a thermodynamic property of the fluid upstream of the valve; a controller configured to monitor the condensate collected in the collection chamber based on the monitored parameter, and to control the opening and closing of the valve to regulate the condensate collected in the collection chamber upstream of the valve; wherein the controller is further configured to determine the quantity of condensate discharged from the collection volume using a flow rate calculation for a choked flow of vaporizing liquid.

20 Claims, 9 Drawing Sheets

(56) References Cited

U.S. PATENT DOCUMENTS

| | | |
|---|---|---|
| 5,530,987 A | 7/1996 | Piccirillo et al. |
| 5,687,755 A | 11/1997 | Farquhar et al. |
| 6,279,593 B1 | 8/2001 | Sheppard |
| 6,510,746 B1 * | 1/2003 | Kotwicki ............... G01F 1/363 702/100 |
| 2009/0199907 A1 | 8/2009 | Aloni |
| 2010/0294377 A1 | 11/2010 | Aloni et al. |
| 2014/0150891 A1 | 6/2014 | Schlensker |

OTHER PUBLICATIONS

Jul. 5, 2016—(GB) Search Report—App. No. GB1601632.1—3 pages.
May 8, 2017—(WO) International Search Report and Written Opinion—App. No. PCT/GB2017/050208—15 pages.
Jan. 24, 2018—(WO) International Preliminary Report on Patentability—App. No. PCT/GB2017/050208—17 pages.

* cited by examiner

CONDENSATE DRAIN APPARATUS

CROSS REFERENCE TO RELATED APPLICATIONS

This application is a National Stage Application under 35 U.S.C. § 371 of co-pending PCT application number PCT/GB2017/050208, filed 27 Jan. 2017; which claims priority to GB1601632.1, filed 28 Jan. 2016, all of which are hereby incorporated by reference in their entireties for any and all non-limiting purposes.

Condensate drains may be used to permit discharge of a condensate phase of a fluid, whilst preventing the discharge of a gaseous phase of the same fluid. A particular example of a condensate drain in the context of steam systems is a steam trap.

It is well known to provide a steam plant for generating and distributing useful energy, in the form of steam, to the point-of-use in various industrial applications.

The presence of excessive condensate in the main steam plant is typically undesirable since it may act as a barrier to heat transfer and can also lead to damaging "water-hammer" and possibly even corrosion of the pipelines. It is therefore preferable to maintain the steam in a steam plant so that it is as dry as possible. To achieve this, condensate is typically drained from the lowest points of the main plant pipeline through one or more drain-lines. In order to limit steam loss from the plant, each drain line is provided with a respective steam trap, which ideally operates to drain condensate whilst at the same time preventing the escape of "live" steam.

Whilst the presence of condensate in the main plant pipeline is typically undesirable, the hot condensate will nevertheless contain useful energy and therefore in a typical steam plant the drain-lines and steam traps will form part of a larger condensate recovery system designed to drain condensate (but ideally not live steam) from the main plant and to recycle the drained condensate through a downstream boiler for subsequent use in the plant. Thus, each drain-line will typically feed into a condensate return line that in turn feeds one or more down-stream receiver tanks. The receiver tanks act as temporary storage units for drained condensate, which is then typically pumped from the receiver tank into the feed-tank of a downstream boiler as required.

Conventional steam traps are typically mechanical devices which open automatically to discharge condensate under certain conditions. For example, a ball float type trap operates based on the difference in density between steam and condensate. Condensate reaching the trap will cause the ball float to rise, lifting the valve off its seat and releasing condensate. However, such mechanical traps are not well suited to operation over varying pressure ranges and are not able to provide data regarding the condensate being discharged.

The present invention seeks to provide an improved condensate drain.

In accordance with a first aspect of the invention, there is provided a condensate drain apparatus comprising: a valve for controlling discharge of condensate from the condensate drain apparatus; a collection chamber configured to receive a multiphase fluid flow upstream of the valve comprising gaseous and condensate phases, the collection chamber defining a collection volume for collecting the condensate to be discharged through the valve; sensor equipment for monitoring a parameter relating to a thermodynamic property of the fluid upstream of the valve; a controller configured to monitor the collection of condensate based on the monitored parameter; and to control the opening and closing of the valve to regulate the collection of condensate upstream of the valve; wherein the controller is further configured to determine the quantity of condensate discharged from the collection volume using a flow rate calculation for a choked flow of vaporizing liquid.

In an example, the condensate drain apparatus may be a steam trap. The condensate drain apparatus may have an inlet for receiving the multiphase fluid flow, which may be steam and condensate. The collection chamber may be coupled to the inlet. The valve may be provided in a wall of the collection chamber. The sensor equipment may comprise a first sensor for determining the temperature of the steam at the inlet. The sensor equipment may comprise a second sensor for determining the temperature of the condensate in the collection volume. The controller may be coupled to the first and second sensors and the valve. The controller may be configured to control the opening and closing of the valve so as to maintain a difference in the temperature of the steam at the inlet and the temperature of the condensate in the collection volume determined using the first and second sensors at a predefined subcool value setpoint.

A thermodynamic property of the fluid may be a phase, temperature or pressure of the fluid, for example. A monitored parameter relating to a thermodynamic parameter may be a function of the thermodynamic property. For example, pressure or temperature may be monitored to determine a thermodynamic property of temperature. In a further example, a resonant frequency of a flexible member may be monitored to determine a thermodynamic property of the phase of the fluid.

The collection chamber may be configured so that in use there may be an interface between condensate collected in the collection chamber and the upstream gaseous phase. In other words the collection chamber may be defined so that condensate collects adjacent the valve and the gaseous phase separates and is disposed upstream of the valve under gravity.

The upstream to downstream direction (i.e. the stream direction or direction of fluid flow) may be the direction along which fluid can be received in the condensate drain apparatus to flow through the collection chamber and be discharged through the valve. It may be the direction from the collection chamber to the valve.

The controller may determine the quantity of condensate discharged from the collection volume using the formula $\dot{m}=C_v N_6 F_{LP}\sqrt{\rho(\bar{p}_1-F_f\bar{p}_v)}$ or a formula derived therefrom.

The valve may be a solenoid valve which has an open position and a closed position. The controller may control a duty time of the solenoid valve to regulate the collection of condensate upstream of the valve.

The sensor equipment may comprise: a phase sensor configured to determine the phase parameter which is a function of the phase of the fluid at a sensing location in the collection chamber; and/or a level sensor configured to determine a phase parameter which is a function of the position of the interface between condensate collected in the collection chamber and the upstream gaseous phase of the fluid. The controller may be configured to control the opening and closing of the valve based on the phase parameter so that the interface between the collection chamber and the upstream gaseous phase of the fluid is maintained within a predetermined range in the collection chamber. For example, the phase sensor may be a conductivity sensor, a resonance density sensor, a capacitance sensor, or a subcool monitoring sensor.

An example subcool monitoring sensor may have a first sensor for determining a temperature of the gaseous phase in a first upstream position of the collection chamber (a first sensing location), and a second sensor for determining a temperature of the condensate collected in the collection chamber at a second downstream position in the collection camber (a second sensing location). The controller may be configured to control opening and closing of the valve to maintain a difference in the temperature of the steam at the inlet and the temperature of the condensate in the collection volume determined using the first and second sensors at a predefined subcool value setpoint.

The sensor equipment may be configured to monitor a phase parameter relating to the phase of the fluid upstream of the valve. For example, the phase parameter may be a function of the phase of the fluid at a location corresponding to the sensor (a sensing location), or may be a function of the location of an interface between the two phases.

The sensor equipment may comprise a level sensor configured to monitor a phase parameter relating to the position of an interface between condensate collected in the collection chamber and an upstream gaseous phase of the fluid. The phase parameter may be a function of the position of the interface between condensate collected in the collection chamber and the upstream gaseous phase of the fluid. The position of the interface relates to the phase of the fluid at locations either side of the interface. For example, based on the position of the interface it may be determined that the phase of the fluid below the position of the interface is liquid, whereas the phase of the fluid above the position of the interface is gas.

The sensor equipment may comprise a float received in the collection chamber and a sensor to determine a phase parameter which is a function of the position of the float.

For example, the float may be a metal chamber, and the sensor may be configured to monitor a parameter which is a function of the position of the float in the collection chamber. For example, the metal chamber may comprise a permanent magnet and the sensor may be a magnetostrictive sensor which generates an output signal corresponding to the magnetostrictive effect of the float (or its permanent magnet) on the sensor).

The sensor equipment may comprise a phase sensor configured to monitor a phase parameter which is a function of the phase of the fluid at a sensing location upstream of the valve.

The phase sensor may be a conductivity sensor configured to monitor the conductivity of the fluid at the sensing location. The phase sensor may be a capacitance sensor configured to monitor a parameter relating to a dielectric property of the fluid at the sensing location.

The phase sensor may be a resonance density sensor configured to monitor the density of the fluid at the sensing location. The density sensor may comprise an element arranged to contact the fluid at the sensing location and an actuator for driving oscillatory motion of the element. The density sensor may be configured to determine a parameter which is a function of the density of the fluid, for example the resonant frequency of oscillation of the element.

In some examples, there may be one phase sensor (e.g. a single sensor) which is provided at a first sensing location, and the controller may be configured to control opening and closing of the valve based on whether the phase sensor indicates that the fluid at the first sensing location is gaseous phase or condensate. For example, the controller may be configured to open the valve or increase its duty cycle when it is determined that the fluid is condensate at the first sensing location; and may be configured to close the valve or reduce its duty cycle when it is determined that the fluid is in the gaseous phase at the first sensing location. The controller may implement a delay between subsequent opening and closing operations. The delay may be set to prevent all of the condensate being discharged when the valve is open before it is subsequently closed. In such examples, the controller may control opening and closing of the valve so as to maintain the interface between the collected condensate and the gaseous phase substantially within a range having an upper limit corresponding to the first sensing location. There may be additional collection of condensate after it is determined that the fluid is condensate at the first sensing location and before opening of the valve or increasing of the duty cycle (e.g. corresponding to any delay between sensing and opening the valve), and so the range may extend beyond the first sensing location depending on the rate of condensate collection and any such delay before discharge of condensate.

In other examples, there may be two phase sensors at first and second sensing locations spaced apart in the collection chamber, and the controller may be configured to maintain the interface between the collected condensate substantially within a range between the two sensing locations. Accordingly, the phase sensors may serve as a form of level sensor configured to monitor when the interface exceeds or drops below a level associated with the respective sensing locations. Any suitable combination of sensors may be used at the first and second sensing locations, for example a temperature sensor (a temperature lower than saturation temperature may indicate the presence of condensate); or a phase sensor such as a capacitive, conductive or density sensor.

The sensor equipment may further comprise a condensate temperature sensor for determining a temperature of the condensate in the collection volume. The controller may be configured to receive or determine an upstream gaseous phase temperature based on an output from a gaseous phase sensor upstream of the condensate temperature sensor. The controller may be configured to determine a subcool value as the temperature difference between the upstream gaseous phase temperature and the temperature of the condensate in the collection volume.

The condensate drain apparatus may be configured to be coupled to a fluid system comprising the gaseous phase sensor, and to receive the multiphase fluid from the fluid system.

The condensate drain apparatus may be configured to be coupled to a fluid system so as to receive the multiphase fluid. The sensor equipment may further comprise the gaseous phase sensor for installing upstream of the condensate temperature sensor in the fluid system.

The condensate drain apparatus may further comprise an inlet for receiving the multiphase fluid flow. The sensor equipment may comprise the gaseous phase sensor upstream of the condensate temperature sensor, and the gaseous phase sensor may be configured to determine the temperature of the gaseous phase at one of the inlet, the collection chamber or a location therebetween.

The gaseous phase sensor may be a pressure sensor. The temperature of the gaseous phase at the respective location of the gaseous phase sensor may be derived based on predetermined data for example a saturated steam table (e.g. when the fluid is water). For example, such derivation may be based on an assumption that the gaseous phase is saturated at the respective location.

The gaseous phase sensor may be a temperature sensor.

The controller may be configured to monitor the collection of condensate based on the subcool value. The controller may be configured to control the opening and closing of the valve so as to maintain the subcool value at a subcool setpoint to regulate the collection of condensate upstream of the valve. The subcool setpoint may be a predetermined setpoint.

The controller may have a user interface through which a user is able to set the subcool setpoint.

The value of $F_{LP}$ used in the calculation of the quantity of condensate may be based on the duty cycle and the subcool value.

When the controller is configured to maintain the subcool value at a subcool setpoint, the value of $F_{LP}$ may be based on the subcool value by virtue of using the subcool setpoint in the calculation of $F_{LP}$, since the subcool value and subcool setpoint may correspond to each other in use.

The value of $F_{LP}$ used in the calculation of the quantity of condensate may be based on the ratio of the duty cycle (DC) to the subcool value (SC). $F_{LP}$ may be calculated using the formula $$F_{LP} = A\ln\left(\frac{DC}{SC}\right) + B,$$

where A and B are constants. The constants A and B may be set at different values for different pressure bands.

The controller may be a PID controller. In other words, the collection of condensate upstream of the valve may be regulated by PID control.

The controller may be configured to determine and output a user notification confirming the presence of one or more of the following conditions: the condensate drain is cold if the temperature of the gaseous phase (e.g. steam temperature at the inlet) and the temperature of the condensate in the collection volume are determined to be below a predetermined value for a predetermined period; the valve has failed open if the temperature of the gaseous phase and the temperature of the condensate in the collection volume both exceed a predetermined value for a predetermined period and are substantially equal to one another; the valve has failed shut if t the temperature of the gaseous phase and the temperature of the condensate in the collection volume are both below a predetermined value for a predetermined period and are substantially equal to one another; the first sensor has failed if the output of the first sensor is open circuit; the second sensor has failed if the output of the second sensor is open circuit; and the condensate drain has flooded if the difference in temperature between gaseous phase and the condensate in the collection volume exceeds a maximum subcool value for a predetermined period. The temperature of the gaseous phase may be as measured by a gaseous phase sensor upstream of a condensate temperature sensor and the valve, for example as installed in a flow system to which the condensate drain apparatus is connected; or at an inlet to the collection chamber, within the collection chamber or therebetween.

An exterior surface of the collection chamber may be provided with cooling fins.

The fluid may be water; the gaseous phase may be steam and the condensate phase may be liquid water.

In accordance with a second aspect of the invention, there is provided a steam trap comprising: an inlet for receiving a flow of steam and condensate; a collection chamber coupled to the inlet so as to receive the steam and condensate and defining a collection volume in which the steam and condensate are separated from one another; a valve provided in a wall of the collection chamber; a first sensor for determining the temperature of the steam at the inlet; a second sensor for determining the temperature of the condensate in the collection volume; a controller coupled to the first and second sensors and the valve, the controller being configured to control the opening and closing of the valve so as maintain a difference in the temperature of the steam at the inlet and the temperature of the condensate in the collection volume determined using the first and second sensors at a predefined subcool value setpoint; wherein the controller is further configured to determine the quantity of condensate discharged from the collection volume using a flow rate calculation for a choked flow of vaporizing liquid.

The controller may determine the quantity of condensate discharged from the collection volume using the formula $\dot{m}=C_v N_6 F_{LP}\sqrt{\rho(p_1-F_f p_v)}$ or a formula derived therefrom.

The valve may be a solenoid valve which has an open position and a closed position, wherein the controller controls a duty time of the solenoid valve to maintain the difference in temperature at the subcool value setpoint.

The value of $F_{LP}$ used in the calculation of the quantity of condensate may be based on the duty cycle and the predefined subcool value.

The value of $F_{LP}$ used in the calculation of the quantity of condensate may be based on the ratio of the duty cycle (DC) to the subcool value (SC).

$F_{LP}$ may be calculated using the formula $$F_{LP} = A\ln\left(\frac{DC}{SC}\right) + B,$$

where A and B are constants.

The constants A and B may be set at different values for different pressure bands.

The first sensor may be a pressure sensor and the temperature of the steam at the inlet may be derived based on a saturated steam table.

The first sensor may be a temperature sensor.

The controller may be a PID controller.

The controller may have a user interface through which a user is able to set the subcool value setpoint.

The controller may be configured to determine and output a user notification confirming the presence of one or more of the following conditions:
  the steam trap is cold if the temperature of the steam at the inlet and the temperature of the condensate in the collection volume are determined to be below a predetermined value for a predetermined period;
  the valve has failed open if the temperature of the steam at the inlet and the temperature of the condensate in the collection volume both exceed a predetermined value for a predetermined period and are substantially equal to one another;
  the valve has failed shut if the temperature of the steam at the inlet and the temperature of the condensate in the collection volume are both below a predetermined value and are substantially equal to one another;
  the first sensor has failed if the output of the first sensor is open circuit;
  the second sensor has failed if the output of the second sensor is open circuit; and the steam trap has flooded if the difference in temperature between the steam at the inlet and the condensate in the collection volume exceeds a maximum subcool value for a predetermined period.

An exterior surface of the collection chamber may be provided with cooling fins.

For a better understanding of the invention and to show more clearly how it may be carried into effect, reference will now be made, by way of example, to the accompanying drawings in which.

Figure 1:
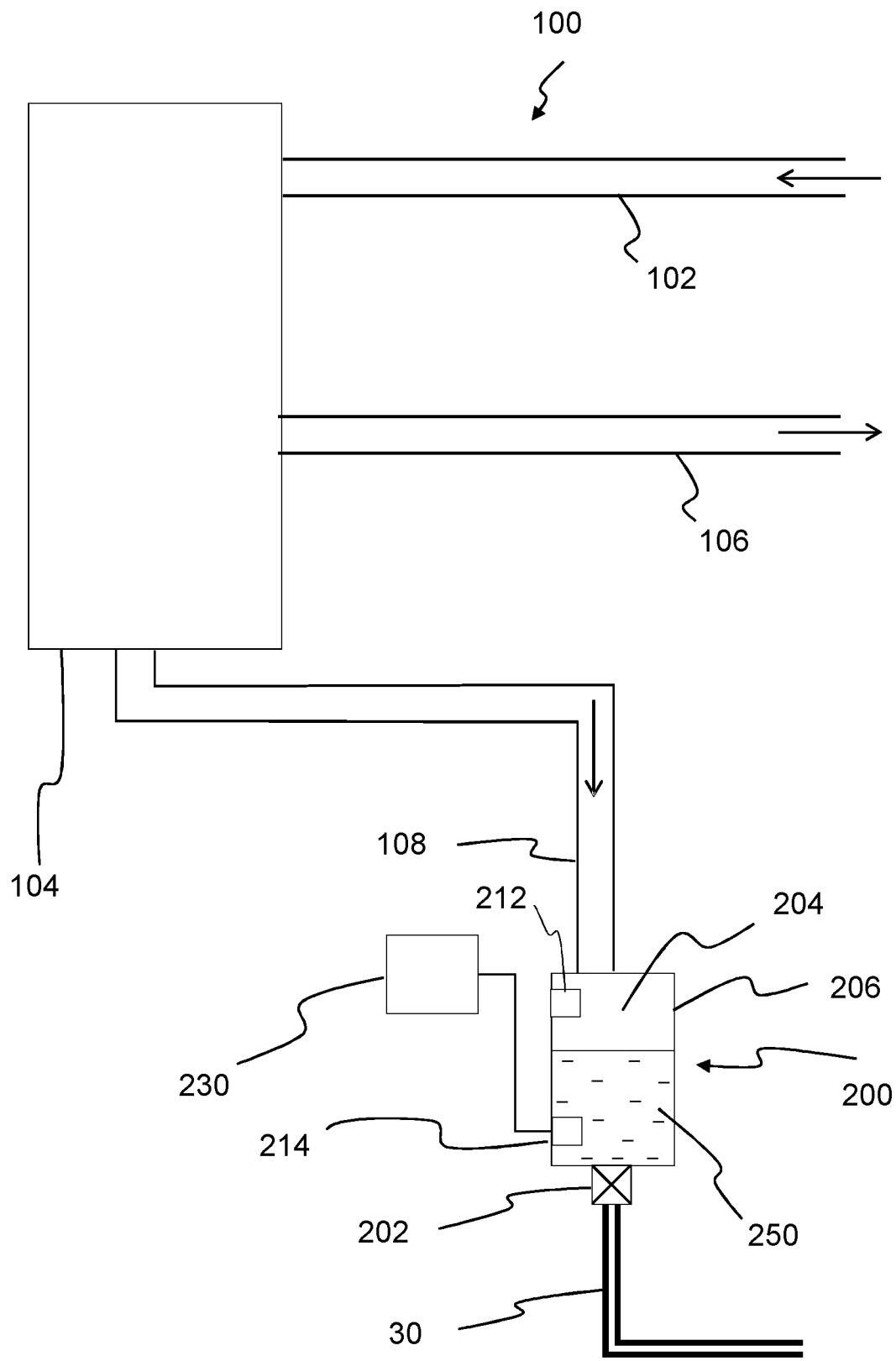
FIG. 1 is a schematic view of an example flow network including a condensate drain.

FIG. 1 shows part of an example flow network 10 comprising a flow system 100, a condensate drain apparatus 200 and a condensate return line 30. The flow system 100 comprises a fluid supply line 102, a heat exchanger 104, a fluid return line 106 and a condensate drain line 108. The flow system 100 may be for conveying any working fluid, such as a refrigerant or water. In this example, the heat exchanger 104 defines a heat transfer chamber configured to receive gaseous fluid from the fluid supply line 102 in an upper portion of the heat transfer chamber and to discharge gaseous fluid from the fluid return line 106 from a lower portion of the heat transfer chamber.

The condensate drain line 108 is coupled to the heat exchanger 104 at a lower portion of the heat exchanger to receive gaseous and/or liquid fluid from the heat exchanger 104.

In an example, the flow system 100 conveys steam as a working fluid for heat transfer in the heat exchanger 104. In use, the fluid supply line 102 conveys saturated steam to the heat exchanger 104. Heat may be transferred from the steam in the heat exchanger 104 such that a portion of the steam condenses. A portion of the uncondensed steam exits the heat exchanger 104 via the fluid return line 106. Condensate falls to the lower portion of the heat exchanger 104 to be discharged from the heat exchanger 104 via the condensate drain line 108.

The condensate drain line 108 is coupled to a condensate drain apparatus 200 configured to receive the condensate and control its discharge to the condensate return line 30. For example, the condensate return line 30 may form part of a condensate return system configured to collect condensate from the flow system 100, for example to recover heat from the condensate.

As shown in FIG. 1, the condensate drain apparatus 200 comprises a valve 202 for controlling the discharge of condensate to the condensate return line 30 and a collection volume 204 upstream of the valve 202 for collecting condensate 250 received from the condensate drain line 108.

In this example, the collection volume 204 of FIG. 1 is defined by a collection chamber 206 schematically shown as having a larger diameter than the condensate drain line 108. However, it will be appreciated that the collection chamber 206 and collection volume may be of any shape, for example a collection chamber may be defined by a section of pipework.

The condensate drain apparatus 200 further comprises sensor equipment for monitoring a parameter relating to a thermodynamic property of the fluid upstream of the valve 202. As will be described by reference to each of the example condensate drain apparatus described with reference to FIGS. 2 and 8-10, various configurations of sensor equipment may be used for monitoring parameters relating to thermodynamic properties, such as temperature and phase. In this example, the sensor equipment comprises a first (or upstream) sensor 212 and a second (or downstream) sensor 214 installed within the collection chamber 206, as will be described in detail below with reference to FIG. 2.

The condensate drain apparatus 200 further comprises a controller 230 configured to monitor the collection of condensate based on the monitored parameter, and to control the opening and closing of the valve 202 to regulate the collection of condensate upstream of the valve 202, as will be described in detail below.

The controller 230 is further configured to determine the quantity of condensate discharged from the collection volume 204 as will be described in detail below.

Figure 2:
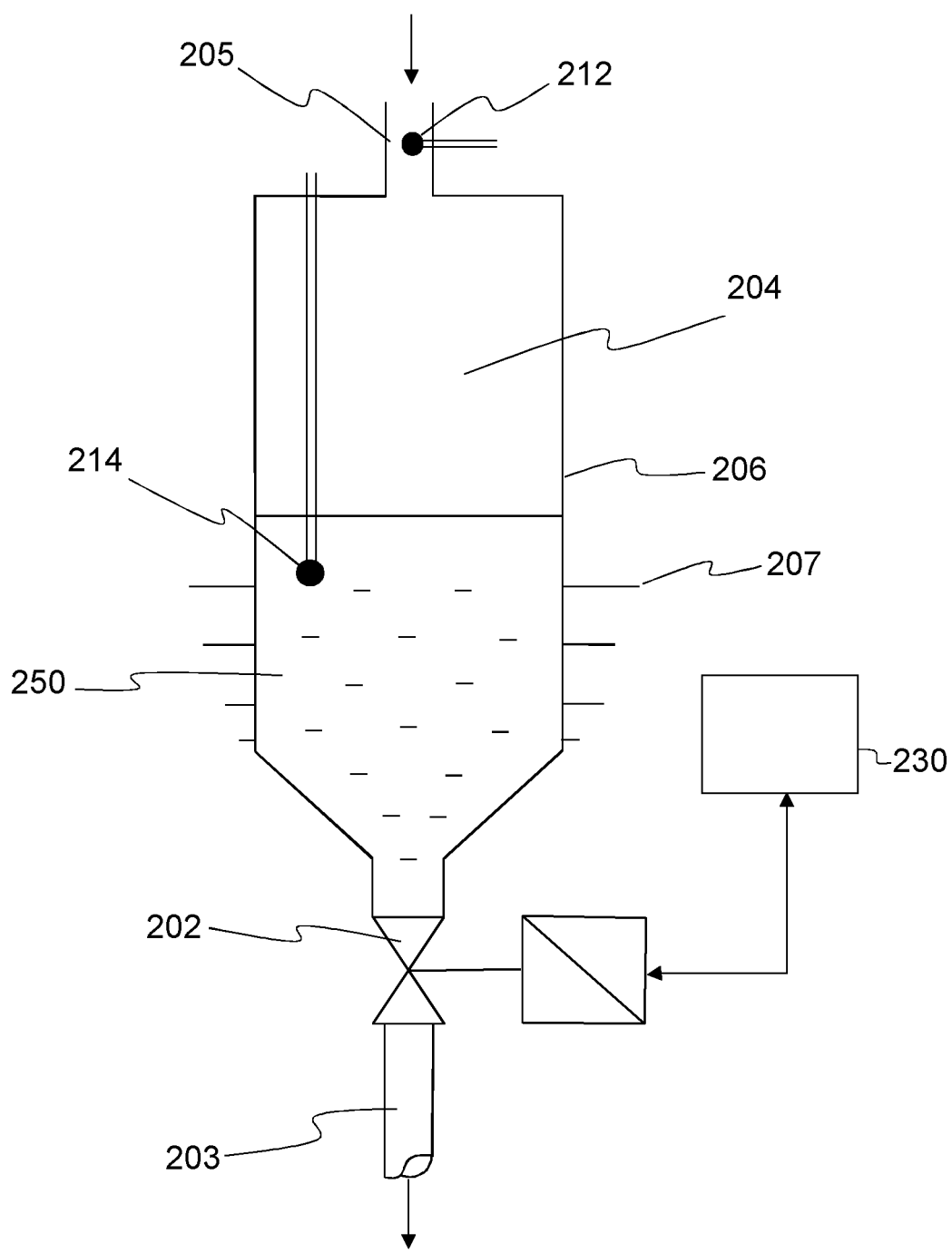
FIG. 2 is a schematic view of the condensate drain according to FIG. 1.

FIG. 2 shows the example condensate drain apparatus 200 for use in the flow network 10 of FIG. 1. The condensate drain apparatus 200 is configured to discharge condensate whilst preventing the discharge of the gaseous phase of the fluid. In this example the gaseous phase is steam, and so the condensate drain apparatus may be referred to as a steam trap or "trap".

The example condensate drain apparatus 200 comprises a collection chamber 206 having an inlet 205 for receiving a flow of steam and condensate (i.e. the gaseous phase and condensate phase of the fluid). The collection chamber 206 defines a collection volume 204 in which the steam and condensate 250 are separated from one another.

In this example, the condensate drain apparatus 200 is configured to control the discharge of condensate based on a subcool value determined as the temperature difference between the gaseous phase as received through the inlet 205 and the condensate phase as collected in the chamber 206. The sensor equipment comprises a first (or upstream) sensor 212 located within the inlet 205 for detecting the temperature of the steam and condensate flowing into the chamber 206. The first sensor 212 may be a pressure sensor or a temperature sensor. Where a pressure sensor is used, the temperature of the steam at the inlet 205 can be derived using a table of saturated steam pressures and temperatures.

A second (or downstream) sensor 214 is located within the collection chamber 206 for detecting the temperature of the condensate within the chamber 206. The second sensor 214 is a temperature sensor and is located so as to be submerged in the condensate collected in the chamber 206.

In this example, the valve 202 is a solenoid valve which is disposed in a lower portion of the collection chamber 206. The valve 202 is disposed between the collection chamber 206 and a drain line 203. The drain line 203 may be coupled to the condensate return line 30 of FIG. 1. The valve 202 can be selectively opened in order to discharge condensate from the collection chamber 206 to the drain line 203.

The controller 230 is coupled to the valve 202. In this example the controller 212 is a PID controller. The controller 230 receives inputs from the first and second sensors 212, 214. The controller 230 has a user interface which allows a user to input a setpoint temperature $t_{sp}$ for the amount of subcool within the condensate drain apparatus 200. The subcool temperature (SC) is the difference between the steam temperature ($t_1$) at the inlet 205 determined by the first sensor 212 and the condensate temperature ($t_2$) within the collection volume 204 determined by the second sensor 214. An exterior surface of the collection chamber 206 may be provided with cooling fins 207 to assist with achieving the desired subcool.

The PID controller 230 controls the actuation of the valve 202 so as to maintain the subcool temperature at the desired setpoint temperature (or "subcool setpoint") i.e. $t_1-t_2=t_{sp}$. The subcool temperature can be controlled by regulating the residence time of the condensate within the collection volume 204. Specifically, the controller 230 modulates the opening and closing of the valve 202 by varying a duty cycle (DC) value of the valve. The duty cycle is expressed as a percentage and represents the proportion of time that the valve 202 is energised. For example, the duty cycle may be set at 1, 2, 3, 4, 5, 10, 25, 50, 75, or 100%. For a valve with a cycle time of 8 seconds, the valve is open for 0.08, 0.16, 0.24, 0.32, 0.4, 0.8, 2, 4, 6 and 8 seconds per cycle time respectively.

Figure 3:
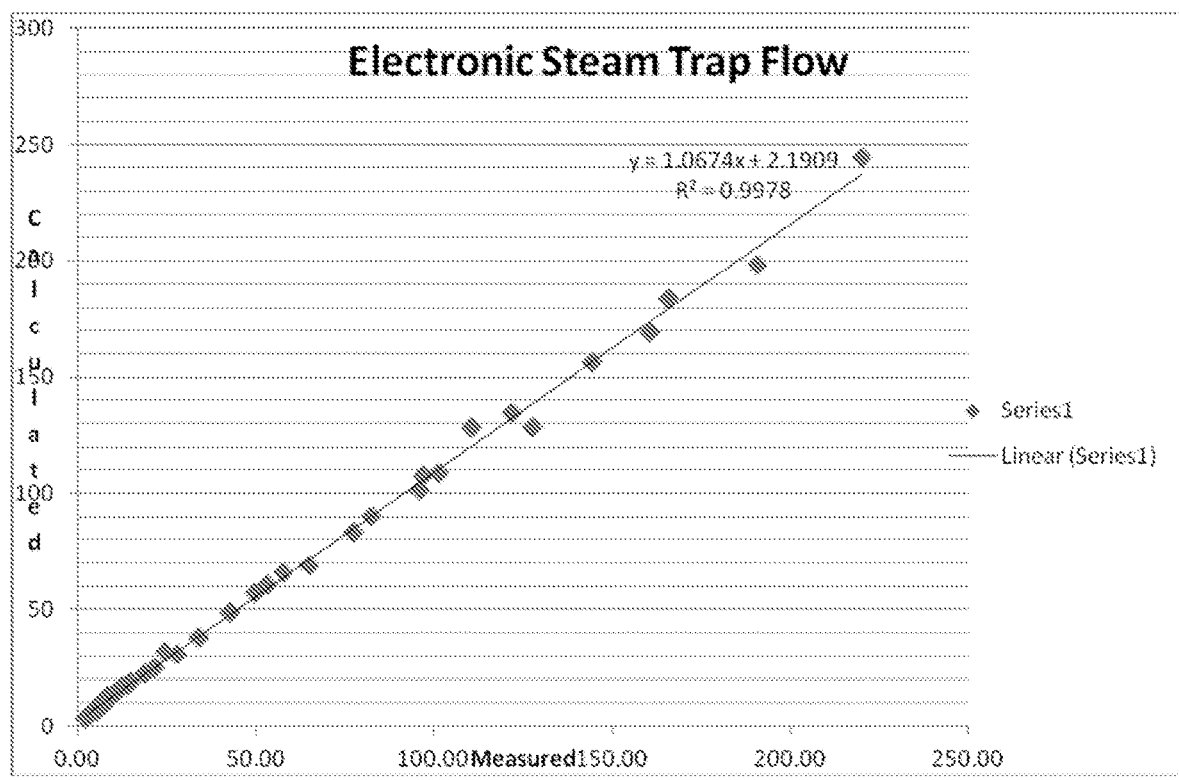
FIG. 3 is a graph showing the correlation between a calculated value of flow and a measured value.

The controller 230 is configured to determine the quantity of condensate discharged from the collection volume using a flow rate calculation for a choked flow of vaporizing liquid. Specifically, the controller determines the quantity of condensate discharged from the collection volume using the Masoneilan formula for mass flow rate $\dot{m}=C_v N_6 F_{LP} \sqrt{\rho(p_1-F_f p_v)}$ or a formula derived therefrom, where:

$C_v$=valve flow coefficient
$N_6$=27.3 kg/hr
$F_f$=liquid critical pressure factor
$F_{LP}$=combined pressure recovery and piping geometry factor for a valve with attached fittings
$p_1$=upstream pressure
$p_v$=vapor pressure of liquid at flowing temperature
$\rho$=specific weight (mass density) upstream conditions FIG. 3 shows the correlation between the values calculated using this formula and actual measured values, with $F_{LP}$ set to 1. As shown, the data fits the regression line with an R-squared value of 0.9978 and with errors of between 1.5% and 8%.

It has been found that when using a solenoid valve (or other intermittently-opening valve) it takes the system a short time to come to equilibrium when opening the valve. It is believed that there is a very short delay of between 250-400 milliseconds before the saturated liquid starts boiling in the solenoid valve orifice in a controlled manner. Therefore, while a solenoid valve has particular advantages over a positioning control valve, such as cost and providing a leak tight shut off, calculating the mass flow rate using the Masoneilan formula, which is derived for un-interrupted flow through an orifice of known $C_v$, leads to less accurate results.

It has been found that the Masoneilan formula can be modified for use with a solenoid valve by using a value of $F_{LP}$ which is based on the duty cycle and the subcool value. Specifically, the value of $F_{LP}$ used in the calculation of the quantity of condensate is based on the ratio of the duty cycle (DC) to the subcool value (SC), and is calculated using the formula $$F_{LP} = A\ln\left(\frac{DC}{SC}\right) + B,$$

where A and B are constants. The constants A and B are set at different values for different pressures or pressure bands of steam at the inlet 205. The pressure of the steam at the inlet 205 may be measured or determined using the first sensor 212 or may be known for the steam system. The constants A and B can be derived empirically through testing over the full range of conditions, i.e. pressure bands, subcool and duty cycle values.

Figure 4:
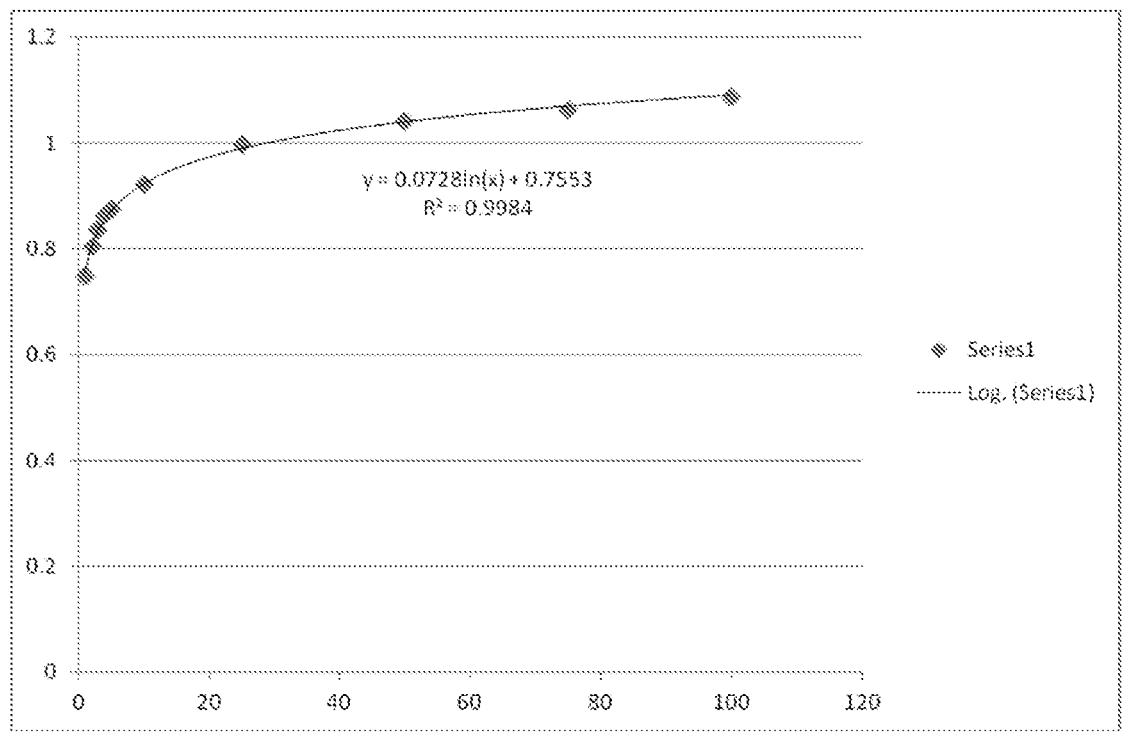
FIG. 4 is a graph showing a $F_{LP}$ value against duty cycle for a pressure of 2 bar.
Figure 5:
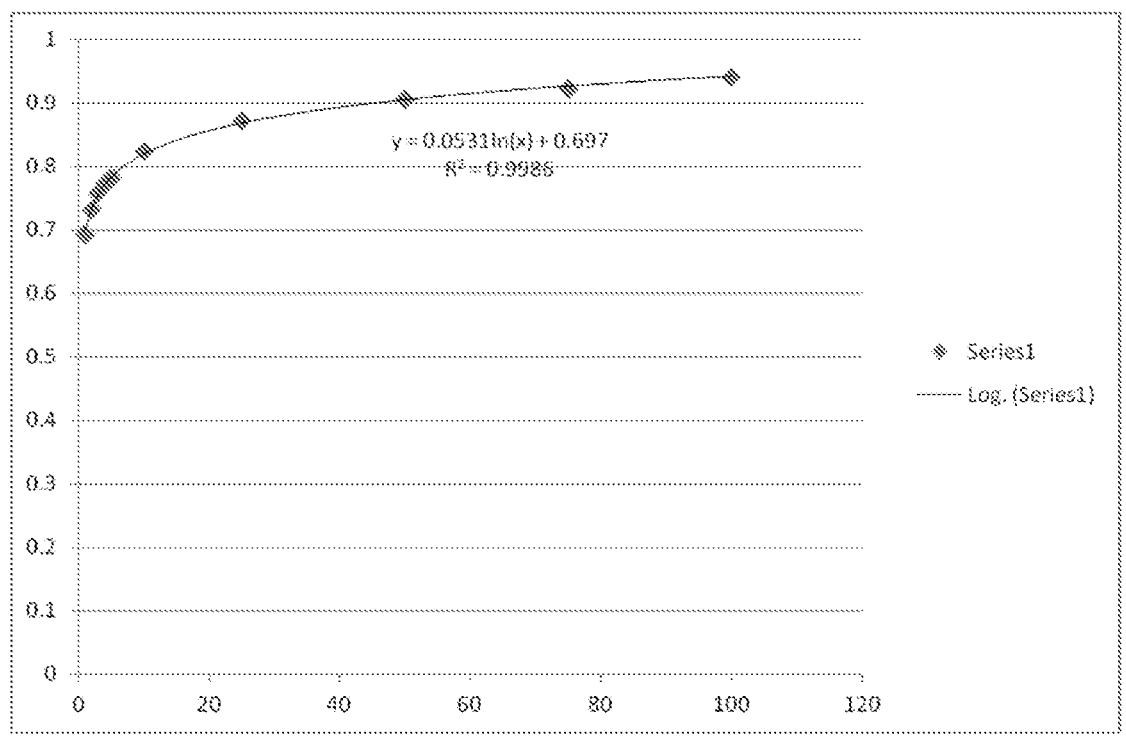
FIG. 5 is a graph showing a $F_{LP}$ value against duty cycle for a pressure of 4 bar.

FIGS. 4 and 5 show values of $F_{LP}$ against duty cycle at 2 and 4 bar respectively. As shown, the $F_{LP}$ values decline with decreasing duty cycle. This is due to the difference between the electrical signal (e.g. the control signal corresponding to the open state of the valve) and the actual movement of the valve. Specifically, as the electrical signal gets very short, the valve cannot respond in the same manner. As pressure has a role in the force required to open the valve, the relationship is different at different pressures, as shown in FIGS. 4 and 5. Consequently, it is necessary to use different values of A and B for each pressure or pressure band.

Figure 6:
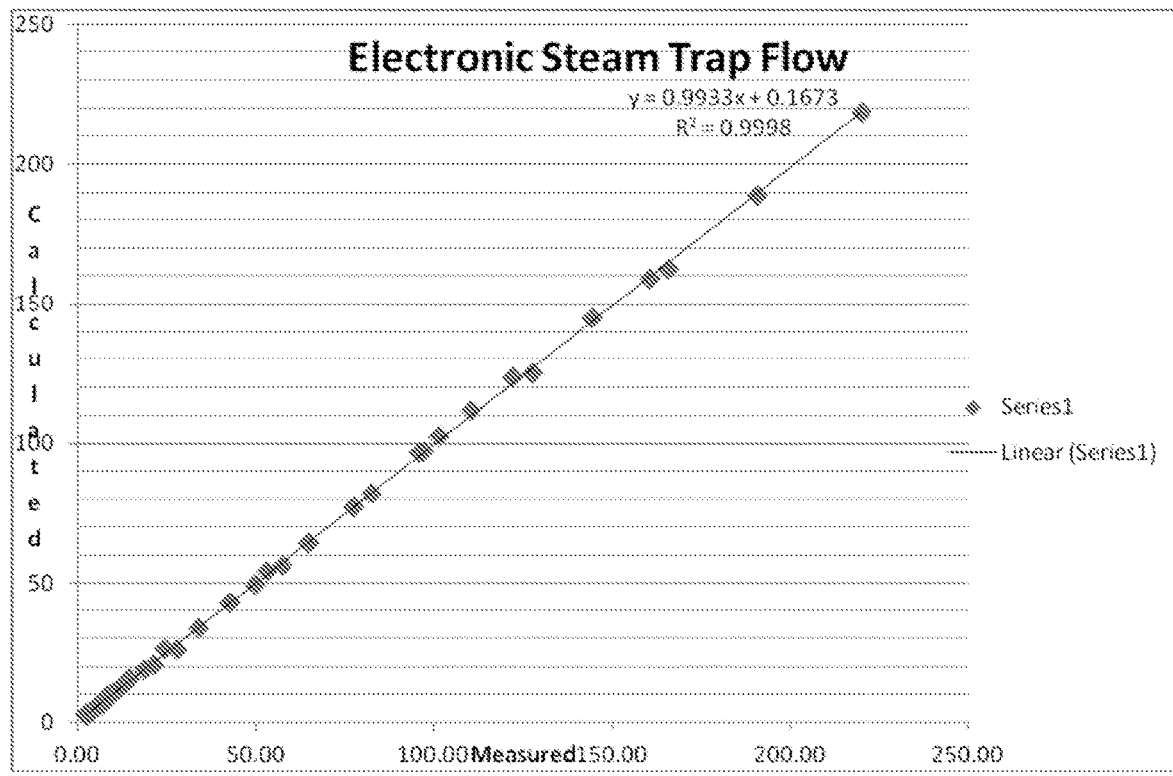
FIG. 6 is a graph showing the correlation between a calculated value of flow and a measured value with a corrected $F_{LP}$ value.

FIG. 6 shows the correlation between the values calculated using the modified Masoneilan formula and actual measured values, with $F_{LP}$ calculated as described above. As shown, the data fits the regression line with an improved R-squared value of 0.9998 and with smaller errors of less than 2.5%. The controller 230 is therefore able to accurately determine the volume of condensate discharged from the collection chamber 206.

The controller 230 is further configured to provide user notifications, such as alarms or other alerts, regarding the status of the condensate drain 200. For example, the controller may be able to determine one or more of the following conditions listed in the table below:

| Condition | $t_1$ | $t_2$ | $t_1-t_2$ | Check | Output |
|---|---|---|---|---|---|
| Start-up | <60° C. | <60° C. | 0 | $t_1 < 60°$ C. and $t_2 < 60°$ C. | Cold |
| Run | 100-240° C. | 70-240° C. | 2-30° C. | $t_1 - t_2 = t_{sp} \pm 2°$ C. | OK |
| Valve fails open | 100-240° C. | 100-240° C. | 0 | $t_1 > 100°$ C. and $t_2 > 100°$ C. and $|t_1 - t_2| \leq 1°$ C. for over 60 seconds | Valve leaking |
| Valve fails shut | Ambient-240° C. | Ambient-240° C. | 0 | $t_1 < 100°$ C. and $t_2 < 100°$ C. and $|t_1 - t_2| \leq 1°$ C. for over 60 seconds | Valve failed shut |
| No steam flow | Ambient-240° C. | Ambient-240° C. | 0 | $t_1 < 60°$ C. and $t_2 < 60°$ C. (same as start up) | Cold |
| If first sensor breaks | Open circuit | | | First sensor voltage<VALUE> | First sensor failure |
| If second sensor breaks | | Open circuit | | Second sensor voltage<VALUE> | Second sensor failure |
| Back up | 100-240° C. | 70-240° C. | >30 | $t_1-t_2 > 31°$ C. for over 60 seconds | Flooded |

The above example is based on steam at a pressure of 32 bar and thus a boiling point of 240° C., with a minimum subcool of 2° C. and a maximum subcool of 30° C.

The controller 230 may communicate with the first and second sensors 212, 214 and the valve 202 through a wired or wireless connection. The controller 230 may be located remotely from the trap itself and a single controller 16 may be used to control several traps as part of a condensate management system.

Although the controller has been described as having a user interface for inputting a subcool value setpoint, this may instead be factory-set. It may be remotely set, for example by a controller for a flow network including the condensate drain 200.

Figure 7:
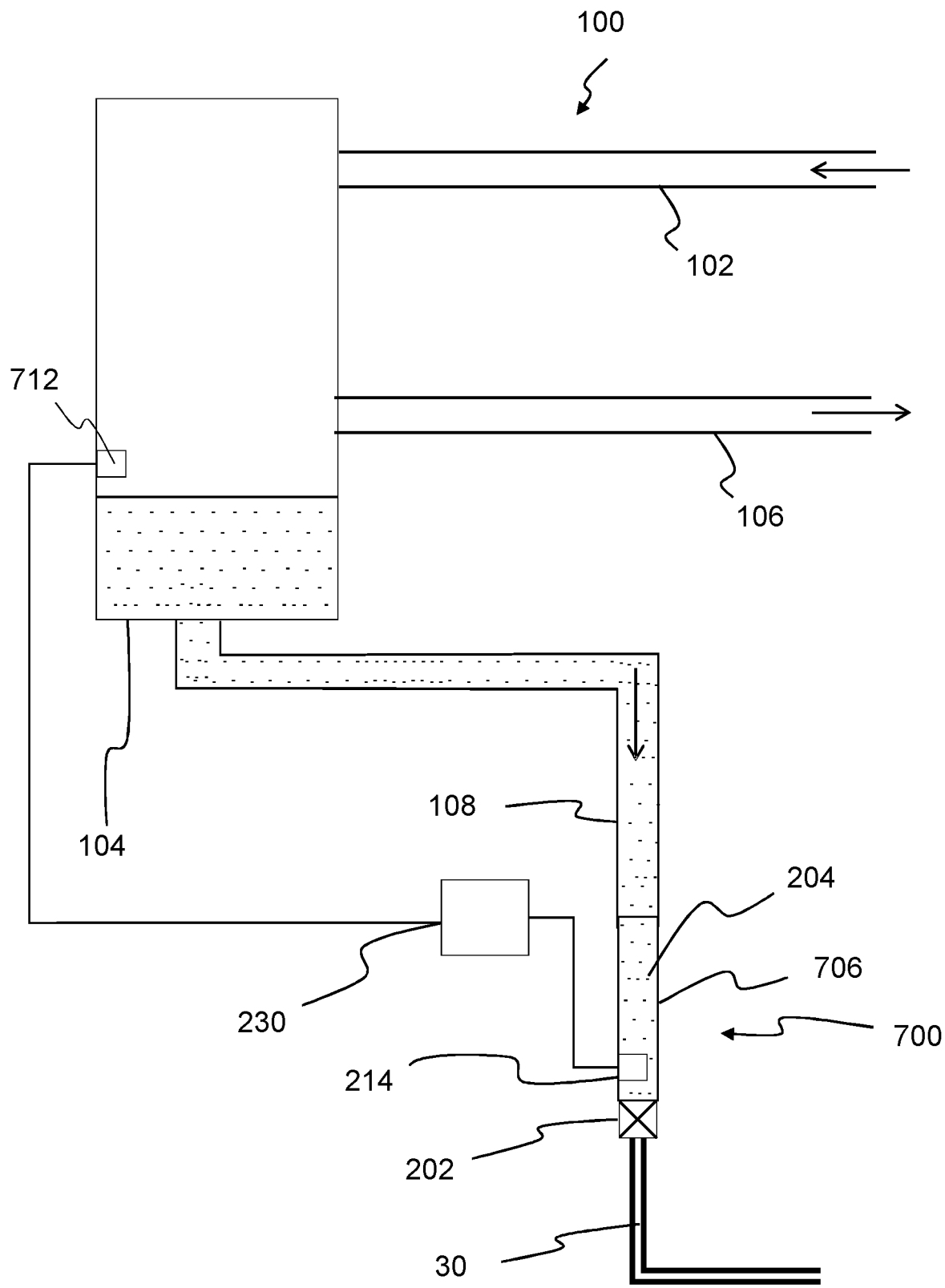
FIG. 7 is a schematic view of an example flow network including a condensate drain according to an embodiment of the invention.

FIG. 7 shows a second example flow network 12 comprising a flow system 100 as described above, a condensate drain apparatus 700 and a condensate return line 30 as described above.

In this example, the condensate drain apparatus 700 is similar to the apparatus 200 described above with reference to FIGS. 1 and 2, but differs firstly in that the collection chamber 706 is formed of a section of pipework. As shown in FIG. 7, the collection chamber 706 is of substantially the same diameter as the condensate drain line 108 of the flow system 100. In this particular example, the collection chamber 706 is a discrete section of pipework joined to the condensate drain line 108 in use, for example, by a flange fitting arrangement. However, in other examples, the collection chamber 706 may be formed by part of the condensate drain line. In yet further examples, a flow system may have a port for fitting a condensate drain apparatus (such as a port in a heat exchanger 104 or in a fluid supply or return line 102, 106), and a collection chamber 706 may be fitted to the port, such that there is no intermediate condensate drain line of the flow system.

As with the collection chamber 206 described above, the collection chamber 706 is configured to receive a multiphase fluid comprising both a gaseous phase and a condensate phase, and is configured so that condensate received therein collects in the collection chamber 706 adjacent the valve with the gaseous phase separating to an upstream position. As will be appreciated, a collection chamber 706 may be so configured by virtue of the valve 202 being disposed at a low position in the chamber 706, and the chamber extending along an upstream to downstream direction towards the valve (i.e. from the flow system to the valve 202) along a direction having a downward component, such that the gaseous and liquid phases having different densities separate therein by action of gravity. There is therefore an interface between the condensate phase and the gaseous phase in use.

As will be appreciated, condensate may continue to collect in the collection chamber 706 such that the interface between the condensate and gaseous phase rises. Condensate may continue to collect so that the interface rises into the condensate drain line and in some examples may rise into other components of the flow system 100, such as the heat exchanger 104, as shown in FIG. 7.

The condensate drain apparatus 700 of FIG. 7 further differs from the apparatus 200 described above with respect to FIG. 2 in the arrangement of the sensor equipment. In this example, the sensor equipment comprises a first (or upstream) sensor 712 for determining the temperature of the gaseous phase which is separate from the collection chamber 706, and in this example is installed in the heat exchanger 104.

The sensor equipment further comprises a second (or downstream) sensor 214 installed in the collection chamber 206 so as to be submerged below the condensate collected therein, as described above.

Despite the different arrangement of the first sensor 712, the condensate drain apparatus 700 is configured to control the collection of condensate upstream of the valve 202 based on maintaining the subcool value at a predetermined subcool setpoint as described above. In this example, the subcool value is the difference in temperatures obtained using the first sensor 712 and the second sensor 714.

By placing the first sensor 712 further upstream of the valve 202, and in particular outside of the condensate drain apparatus 700 and instead within the flow system 100, the flow network 12 can be operated to allow more condensate to collect upstream of the valve.

In particular, in operation the gaseous phase may be maintained at saturation temperature for a given pressure, which may be substantially uniform in a particular part of the flow network, such as in the heat exchanger 104. Upon condensing, condensate will initially be at saturation temperature, but there may be a temperature gradient of reducing temperature between condensate at the interface between the condensate and gaseous phases, and condensate adjacent the valve 202 for discharging.

When using subcool monitoring sensor arrangement as described above, the collection of condensate may be controlled by setting the subcool setpoint. For example, if a low subcool setpoint (i.e. a low difference in temperature is set), the subcool value may reach the setpoint when a relatively small amount of condensate has collected upstream of the valve 202, and similarly when the residence time of the condensate upstream of the valve is relatively low. Since the controller causes the valve to open and close to regulate the collection of condensate to maintain the subcool value at the setpoint, a relatively low subcool setpoint may correspond to a small standing amount of condensate collected upstream of the valve during operation.

In contrast, by setting a larger subcool value, more condensate may be permitted to collect upstream of the valve on average and the residence time of the condensate may be greater. In some examples, setting a larger subcool setpoint may lead to more efficient thermal operation of the flow network. In particular, less thermal energy may be discharged from the flow system through the condensate drain since the temperature of the condensate prior to discharge may be lower. Therefore, more thermal energy may be retained in the flow system.

In some examples, a first sensor for monitoring a temperature of the gaseous phase may be spaced apart from a second sensor for monitoring a temperature of collected condensate by an amount corresponding to the subcool setpoint. For example, the sensors may be relatively close together when the subcool setpoint is relatively low, or when there is significant cooling between the sensors (for example, owing to external cooling fins). However, when the subcool setpoint is relatively higher, condensate may collect up to the position of the first sensor unless they are adequately spaced apart.

In the example of FIG. 7, the sensor equipment of the condensate drain apparatus 700 includes the first sensor 712 which is installed in the flow system upstream of the collection chamber 706. In other examples, a condensate drain apparatus may not include such a first sensor 712, but may instead be configured to receive or determine a temperature of the upstream gaseous phase based on an output of a sensor of a flow system 100, for example a temperature sensor within the flow system such as in a heat exchanger to which the condensate drain can be connected.

Figure 8:
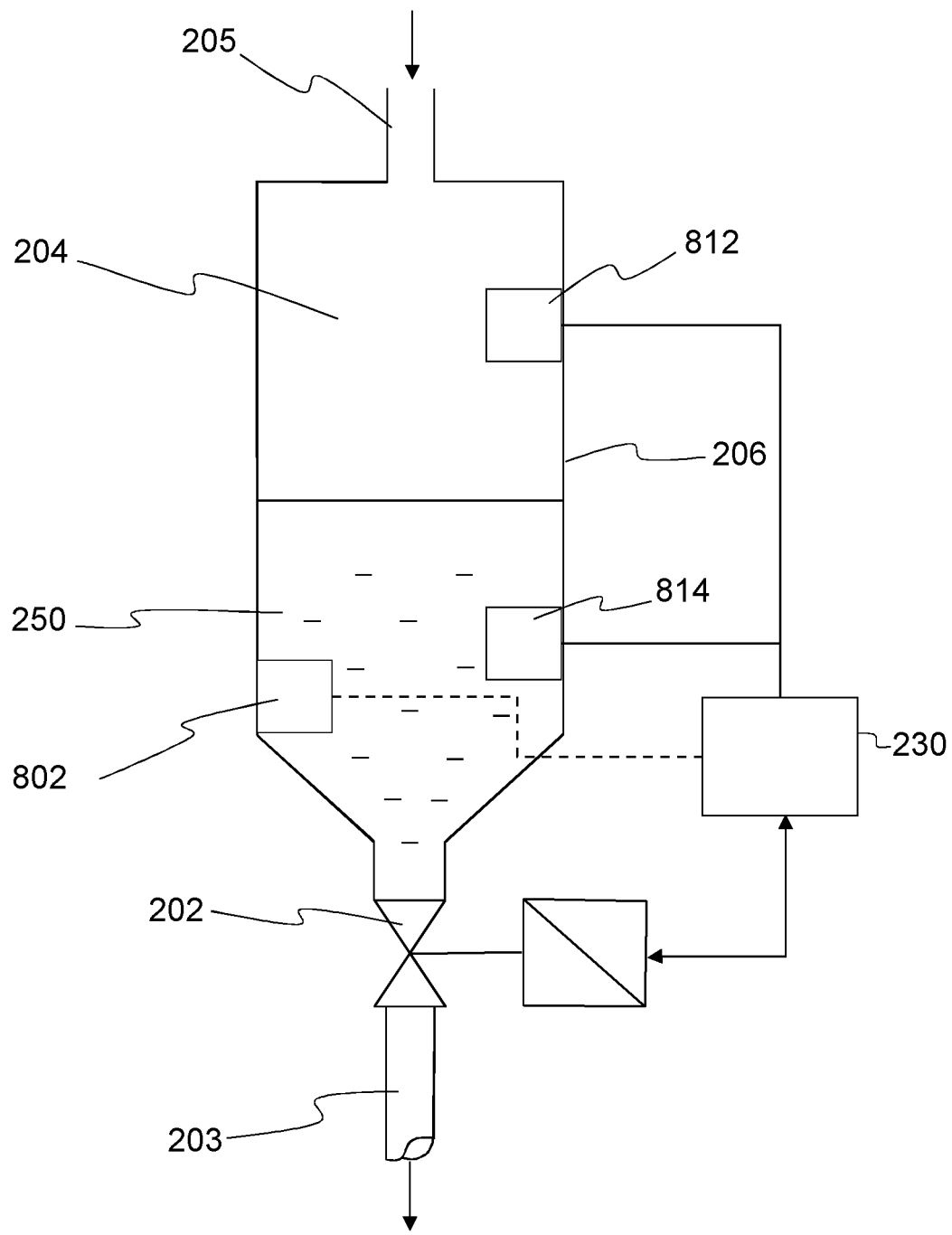
FIGS. 8-10 show further example condensate drains.

FIG. 8 shows a further example condensate drain apparatus 800. The condensate drain apparatus 800 is similar to the apparatus 200 described above with reference to FIG. 2 but differs in the configuration of the sensor equipment and controller 230 for controlling opening and closing of the valve 202.

In this example, the sensor equipment includes a first (or upstream) sensor 812 disposed at a first (or upstream) sensing location in an upper portion of the collection chamber 206, and a second (or downstream) sensor 814 at a second (or downstream) sensing location in a lower portion of the collection chamber 206. The controller 230 is configured to control the opening and closing of the valve 202 based on outputs of the first and second sensors to regulate the collection of condensate in the collection chamber 206 so that in use the interface between the collected condensate and upstream gaseous phase is at or between the two sensing locations (i.e. the first and second or upstream and downstream sensing locations).

In this example, the first and second sensors 812, 814 are configured to monitor a phase parameter which is a function of the phase of the fluid at the respective sensing location.

In this particular example, the first and second sensors 812, 814 are conductivity sensors. Conductivity sensors may monitor the conductivity of a medium in which they are disposed, for example by applying a load between two electrodes extending into the medium. Since different phases of a fluid typically have different conductivities, it can be determined whether the fluid is in the condensate or gaseous phase at the respective sensing location depending on the characteristics of electrical conduction between the two electrodes. For example, each conductivity sensor may be configured to generate an output corresponding to the conductivity of the medium, a voltage drop between the electrodes, an apparent impedance through the medium or a current flow through the system, each of which is a parameter which is a function of the conductivity of the medium.

The controller 230 is configured to receive outputs from the first and second sensors 812, 814 and control opening and closing of the valve 202 to maintain an interface between the collected condensate and upstream gaseous phase at or between the two sensing locations. For example, the controller 230 may be configured to close the valve or reduce the duty cycle of the valve when it is determined that the fluid is in the gaseous phase at the second sensing location (or when the phase parameter is indicative of the fluid being in the gaseous phase). Similarly, the controller 230 may be configured to open the valve or increase the duty cycle of the valve when it is determined that the fluid is in the condensate phase at the first sensing location (or when the phase parameter is indicative of the fluid being in the condensate phase).

As shown in FIG. 8, in this example the sensor equipment further comprises a condensate temperature sensor 802 within the collection chamber 206 at a position so as to be submersed below the collected condensate in use. In this example, the condensate temperature sensor 802 is at or below the level of the second (downstream) sensor 814. The controller 230 is configured to determine the temperature of the collected condensate using the condensate temperature sensor 802. The condensate temperature may be used to derive terms of the Masoneilan formula for determining the quantity of condensate discharged from the collection chamber.

In further examples, the controller may be configured to receive or determine an upstream gaseous phase temperature, for example based on an output from a gaseous phase sensor upstream of the condensate temperature sensor. For example, the gaseous phase sensor may be installed within the collection chamber or upstream of the condensate drain apparatus. The upstream gaseous phase temperature may be predetermined and stored in a memory of the controller or otherwise provided to the controller.

In such examples, the controller may determine a subcool value as the temperature difference between the upstream gaseous phase temperature and the temperature of the condensate in the collection volume. The subcool value can be used in the evaluation of the Masonelian formula as described above, even when the controller is not configured to control opening and closing of the valve based on the subcool value.

Figure 9:
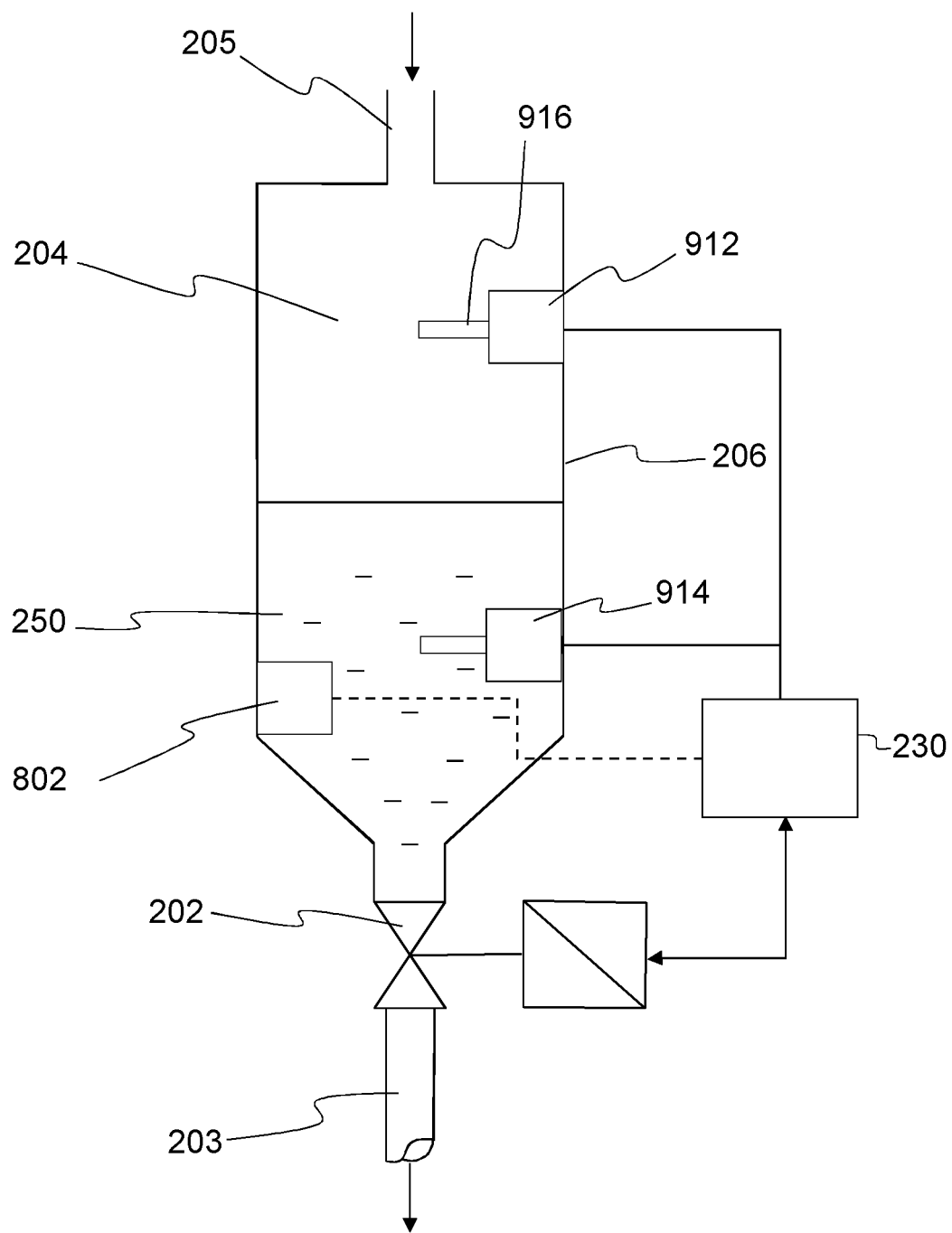

In a further example, the first and second sensors 812, 814 may be capacitive sensors configured to generate an output which is a function of the dielectric properties of the fluid at the first and second sensing locations. Such capacitive sensors may have opposing plates disposed within the collection chamber at the respective sensing locations, and may generate an output which is a function of the dielectric properties of the fluid between them. The dielectric properties of the gaseous phase and the condensate phase may differ, such that it may be determined based on the output whether the fluid at the respective sensing locations is in the FIG. 9 shows a further example condensate drain apparatus 900 which is similar to the apparatus 800 described above with respect to FIG. 8 but differs in the specific type of the first and second sensors 912, 914.

In this example, the first (upstream) sensor 912 and the second (downstream) sensor 914 are density sensors configured to generate an output which is a function of the density of the fluid at the respective sensing location. In this particular example, each sensor comprises a flexible member 916 extending into the collection volume 204 at the respective sensing location and an actuator configured to oscillate the flexible member 916. Such resonance density sensors operate on the principle that the resonant frequency of oscillation is dependent on the density of the fluid. The sensors 912, 914 are configured to oscillate the flexible members 916 to find the resonant frequency and generate an output signal encoding the frequency or related parameter. As in the examples described above with respect to FIG. 8, the controller is configured to receive the output signals which are indicative of the phase of the fluid at the respective sensing locations, and control the opening and closing of the valve 202 accordingly.

In other examples, the first and second sensors may use a mix of different sensor types. For example, the first sensor may be a density sensor and the second sensor may be a conductivity sensor.

Figure 10:
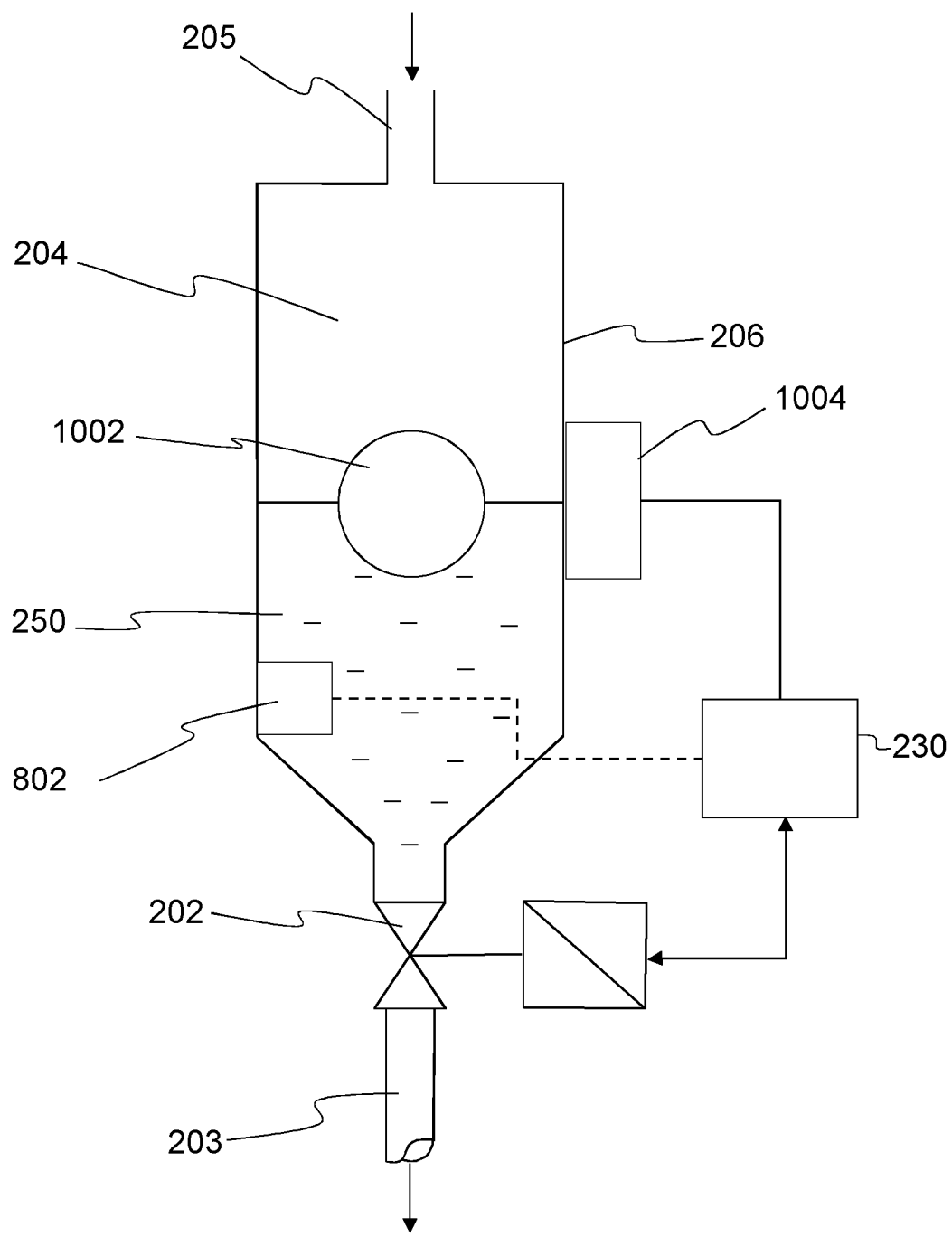

FIG. 10 shows a further example of a condensate drain 1000 which is similar to the apparatus 800 described above with respect to FIG. 8 but differs in the sensor equipment.

In this example, the sensor equipment comprises a level sensor configured to monitor a parameter relating to the position of the interface between the collected condensate and the upstream gaseous phase in the collection chamber 206.

In this example, the level sensor comprises a float 1002, such as a metal ball enclosing a sealed gas or vacuum, which is disposed within the collection chamber 206 so as to float at the interface between the collected condensate and the upstream gaseous phase. The level sensor further comprises a sensor 1004 for monitoring a parameter which is a function of the position of the float 1002 in the collection chamber (and thereby a function of the position of the interface). For example, the float 1002 may comprise a permanent magnet, and the sensor 1004 may be a magnetostrictive sensor configured to monitor a magnetostrictive strain which is a function of the relative position of the float 1002 in the chamber 206.

Other types of level sensor may be used, such as magnetic, mechanical and capacitive sensors, for example.

Although examples of the invention have been described with reference to a solenoid valve which opens intermittently according to a duty cycle, other intermittently-opening valves may be used. For example, a diaphragm valve may be used. Further, such valves may be electrically, pneumatic or hydraulically actuated.

Although the invention has been described with reference to a solenoid valve or other intermittently opening valve, aspects may also be used with a positioning control valve or other kinds of throttling valve.

For example, a positioning control valve or throttling valve may be controllable to define a variable-size opening through the valve to meter the flow therethrough.

We claim:

1. A condensate drain apparatus comprising:
a valve configurable to control discharging of a condensate from the condensate drain apparatus;
a collection chamber configured to receive a multiphase fluid flow upstream of the valve comprising gaseous and condensate phases, the collection chamber further defining a collection volume adapted to collect the condensate to be discharged through the valve;
sensor equipment configured to monitor a parameter relating to a thermodynamic property of the fluid upstream of the valve; and
a controller having a processor and a non-transitory computer-readable medium comprising computer-executable instructions that when executed by the processor, cause the processor to at least:
monitor the condensate collected in the collection chamber based on the monitored parameter;
control opening and closing of the valve to regulate the condensate collected in the collection chamber upstream of the valve; and
determine a quantity of condensate discharged from the collection volume using a flow rate calculation for a choked flow of vaporizing liquid.

2. The condensate drain apparatus according to claim 1, wherein the controller determines the quantity of condensate discharged from the collection volume using the formula $\dot{m}=C_v N_6 F_{LP} \sqrt{\rho(p_1-F_f p_v)}$ or a formula derived therefrom, where $C_v$ is the valve flow coefficient, $N_6$ is 27.3 kg/hr, $F_f$ is the liquid critical pressure factor, $F_{LP}$ is the combined pressure recovery and piping geometry factor for a valve with attached fittings, $p_1$ is the upstream pressure, $p_v$ is the vapour pressure of liquid at flowing temperature and $\rho$ is the specific weight (mass density) of the condensate upstream from the valve.

3. The condensate drain apparatus according to claim 1, wherein the valve is a solenoid valve which has an open position and a closed position, wherein the controller controls a duty time of the solenoid valve to regulate the condensate collected in the collection chamber upstream of the valve.

4. The condensate drain apparatus according to claim 1, wherein the sensor equipment comprises at least one of:

a phase sensor configured to determine a first phase parameter which is a function of a phase of the fluid at a sensing location in the collection chamber, and
a level sensor configured to determine a second phase parameter which is a function of a position of the interface between the condensate collected in the collection chamber and the upstream gaseous phase of the fluid;
wherein the controller is configured to control the opening and closing of the valve based on at least one of the first phase parameter and the second phase parameter so that the position of the interface between the condensate collected in the collection chamber and the upstream gaseous phase of the fluid is maintained within a predetermined range in the collection chamber.

5. The condensate drain apparatus according to claim 1, wherein the sensor equipment further comprises a condensate temperature sensor configured to determine a temperature of the condensate in the collection volume.

6. The condensate drain apparatus according to claim 5, wherein the controller is configured to receive or determine an upstream gaseous phase temperature based on an output from a gaseous phase sensor upstream of the condensate temperature sensor; and
wherein the controller is configured to determine a subcool value as a temperature difference between the upstream gaseous phase temperature and the temperature of the condensate in the collection volume.

7. The condensate drain apparatus according to claim 6, further comprising an inlet for receiving the multiphase fluid flow;
wherein the sensor equipment further comprises the gaseous phase sensor upstream of the condensate temperature sensor, and wherein the gaseous phase sensor is configured to determine the temperature of the gaseous phase at one location selected from the group consisting of: the inlet, the collection chamber a location between the inlet and the collection chamber, and combinations thereof.

8. The condensate drain apparatus according to claim 6, wherein the controller is configured to monitor the condensate collected in the collection chamber based on the subcool value; and
wherein the controller is configured to control the valve so as to maintain the subcool value at a subcool setpoint to regulate the condensate collected in the collection chamber upstream of the valve.

9. The condensate drain apparatus according to claim 6, wherein the controller determines the quantity of condensate discharged from the collection volume using the formula $\dot{m}=C_v N_6 F_{LP} \sqrt{\rho(p_1-F_f p_v)}$ or a formula derived therefrom, where $C_v$ is the valve flow coefficient, $N_6$ is 27.3 kg/hr, $F_f$ is the liquid critical pressure factor, $F_{LP}$ is the combined pressure recovery and piping geometry factor for a valve with attached fittings, $p_1$ is the upstream pressure, $p_v$ is the vapour pressure of liquid at flowing temperature and $\rho$ is the specific weight (mass density) of the condensate upstream from the valve;
wherein the value of $F_{LP}$ used in the calculation of the quantity of condensate is based on a duty cycle and the subcool value, wherein the duty cycle is the proportion of time that the valve is open; and
wherein the value of $F_{LP}$ used in the calculation of the quantity of condensate (250) is based on a ratio of the duty cycle (DC) to the subcool value (SC).

10. The condensate drain apparatus as claimed in claim 9, wherein $F_{LP}$ is calculated using the formula $$F_{LP} = A\ln\left(\frac{DC}{SC}\right) + B,$$

where A and B are constants;
wherein the constants A and B are set at different values for different pressure bands.

11. The condensate drain apparatus as claimed in claim 1, wherein the controller is a PID controller.

12. A steam trap comprising:
an inlet configured to receive a flow of steam and condensate;
a collection chamber coupled to the inlet so as to receive the steam and condensate and defining a collection volume in which the steam and condensate are separated from one another by gravity;
a valve provided in a wall of the collection chamber;
a first sensor configured to determine a temperature of the steam at the inlet;
a second sensor configured to determine a temperature of the condensate in the collection volume;
a controller coupled to the first and second sensors and the valve, the controller being configured to control opening and closing of the valve so as maintain a difference in the temperature of the steam at the inlet and the temperature of the condensate in the collection volume determined using the first and second sensors at a predefined setpoint of a subcool value, wherein the subcool value is the temperature difference between an upstream gaseous phase temperature and the temperature of the condensate in the collection volume;
wherein the controller is further configured to determine a quantity of condensate discharged from the collection volume using a flow rate calculation for a choked flow of vaporizing liquid.

13. The steam trap as claimed in claim 12, wherein the controller determines the quantity of condensate discharged from the collection volume using the formula $\dot{m} = C_v N_6 F_{LP} \sqrt{\rho(p_1 - F_f p_v)}$ or a formula derived therefrom, where $C_v$ is the valve flow coefficient, $N_6$ is 27.3 kg/hr, $F_f$ is the liquid critical pressure factor, $F_{LP}$ is the combined pressure recovery and piping geometry factor for a valve with attached fittings, $p_1$ is the upstream pressure, $p_v$ is the vapour pressure of liquid at flowing temperature and $\rho 0$ is the specific weight (mass density) of the condensate upstream from the valve.

14. The steam trap as claimed in claim 13, wherein the valve is a solenoid valve which has an open position and a closed position, wherein the controller controls a duty time of the solenoid valve to maintain the difference in temperature at the predefined subcool value setpoint.

15. The steam trap as claimed in claim 14, wherein a value of $F_{LP}$ used to determine the quantity of condensate is based on a duty cycle and the predefined subcool value setpoint, wherein the duty cycle is a proportion of time that the valve is open;
wherein the value of $F_{LP}$ used to determine the quantity of condensate is based on a ratio of the duty cycle (DC) to the subcool value (SC).

16. The steam trap as claimed in claim 12, wherein the first sensor is a pressure sensor and wherein the temperature of the steam at the inlet is derived based on a saturated steam table.

17. The steam trap as claimed in claim 12, wherein the first sensor is a temperature sensor.

18. The steam trap as claimed in claim 12, wherein the controller has a user interface through which a user is able to set the predefined subcool value setpoint.

19. The steam trap as claimed in claim 12, wherein the controller is configured to determine and output a user notification confirming a presence of one or more of the following conditions:
the steam trap is cold if the temperature of the steam at the inlet and the temperature of the condensate in the collection volume are determined to be below a predetermined value for a predetermined period;
the valve has failed open if the temperature of the steam at the inlet and the temperature of the condensate in the collection volume both exceed a predetermined value for a predetermined period and are substantially equal to one another;
the valve has failed shut if the temperature of the steam at the inlet and the temperature of the condensate in the collection volume are both below a predetermined value for a predetermined period and are substantially equal to one another;
the first sensor has failed if the output of the first sensor indicates an open circuit;
the second sensor has failed if the output of the second sensor indicates an open circuit; and
the steam trap has flooded if the difference in temperature between the steam at the inlet and the condensate in the collection volume exceeds a maximum subcool value for a predetermined period.

20. The steam trap as claimed in claim 12, wherein an exterior surface of the collection chamber is provided with cooling fins.

* * * * *